United States Patent
Nylander et al.

(10) Patent No.: US 8,386,766 B2
(45) Date of Patent: Feb. 26, 2013

(54) METHOD AND ARRANGEMENT FOR DECIDING A SECURITY SETTING

(75) Inventors: Tomas Nylander, Varmdo (SE); Jari Vikberg, Jarna (SE); Oscar Zee, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 12/738,402

(22) PCT Filed: Oct. 17, 2007

(86) PCT No.: PCT/SE2007/000914
§ 371 (c)(1),
(2), (4) Date: Apr. 16, 2010

(87) PCT Pub. No.: WO2009/051528
PCT Pub. Date: Apr. 23, 2009

(65) Prior Publication Data
US 2010/0235620 A1 Sep. 16, 2010

(51) Int. Cl.
*H04L 29/06* (2006.01)
*H04L 9/32* (2006.01)
(52) U.S. Cl. ......... 713/151; 713/150; 713/161; 713/168
(58) Field of Classification Search .................. 713/151, 713/152, 153, 166, 150, 161, 168
See application file for complete search history.

(56) References Cited

U.S. PATENT DOCUMENTS

| 7,010,681 | B1* | 3/2006 | Fletcher et al. ................ 713/154 |
| 8,174,994 | B2* | 5/2012 | Forssell et al. ................ 370/252 |
| 2006/0020712 | A1 | 1/2006 | Wanek et al. |
| 2006/0251255 | A1* | 11/2006 | Batta ............................. 380/270 |
| 2007/0109982 | A1* | 5/2007 | Gudipudi et al. .......... 370/310.2 |
| 2007/0169169 | A1 | 7/2007 | Zheng et al. |
| 2007/0226775 | A1* | 9/2007 | Andreasen et al. ............... 726/1 |

FOREIGN PATENT DOCUMENTS

| EP | 1583312 A1 | 10/2005 |
| EP | 1689206 A1 | 8/2006 |
| JP | 2002064482 A | 2/2002 |
| WO | 2006069522 A1 | 7/2006 |

* cited by examiner

*Primary Examiner* — Mohammad W Reza
(74) *Attorney, Agent, or Firm* — Coats & Bennett, P.L.L.C.

(57) ABSTRACT

The present invention relates to a method and arrangements in a mobile telecommunications network including a plurality of access points (203), a plurality of 5 network gateway devices (204). The method comprising the steps of: deciding a security setting needed for a dedicated bearer signal by a network component, communicating said decision to a node needed for establishing communication, configuring or selecting by said access point (203) a secure protocol (205) as needed between said access point and said gateway devices (204), and said decision being based on one or several of the network deployment being used and/or network operator policies.

11 Claims, 7 Drawing Sheets

METHOD AND ARRANGEMENT FOR DECIDING A SECURITY SETTING

TECHNICAL FIELD

The present invention generally relates to a security method in a communications network between at least two nodes. More specifically the invention relates to deciding security settings when establishing a bearer for a session and ensuring that the initially decided security settings are maintained when the bearer is moved to other nodes.

BACKGROUND

The LTE (Long Term Evolution) and SAE (System Architecture Evolution) architecture is currently being specified by 3GPP, e.g. for inclusion in 3GPP Release-8. FIGS. 1a and 1b show conventional architectures so far agreed as part of the SAE/LTE standardization work in 3GPP, e.g. as described in 3GPP TS 23.401 for the non-roaming scenarios. FIG. 1a shows Non-roaming architecture for 3GPP accesses and FIG. 1b shows non-roaming architecture for 3GPP accesses in a single gateway option.

Transport Network level security in the S1 interface (i.e. both the S1-MME and S1-U interfaces) is needed in many deployment scenarios between Evolved UTRAN (E-UTRAN), comprising a single node type called E-UTRAN NodeB (eNodeB), and the Core Network (CN) nodes, Mobility Management Entity (MME) and Serving Gateway (FIGS. 1a and 1b also show the PDN Gateway and the combination of the Serving Gateway and PDN Gateway is also known as SAE-GW which is the term used in this application for both these gateway nodes). The S1 interface (both the S1-MME and S1-U interfaces) may traverse insecure IP networks. One example of such a deployment scenario is the Home eNodeB (HNB) concept currently being studied in 3GPP.

The S1 interface security is based on IPsec tunnels which are established between the eNodeBs (or HNBs) and the Security GateWays (SEGW) in the network side. The SEGW functionality could theoretically be incorporated in SAE-GW's and MME's, however it's most likely that this will be handled by dedicated equipment due to the quite heavy processing capacity needed for IPsec.

The signaling sequences to establish a dedicated SAE/LTE bearer is shown in FIG. 3. This figure shows as an example that the bearer is created for an IMS VoIP/SIP call/transaction in the case when network initiated bearer activation is applied via the Policy and Charging Rules Function (PCRF).

The interface between the P-CSCF and the PCRF is called "Rx+"-interface and is based on the Rx-interface which is specified for 3GPP, e.g. Release-7 in 3GPP TS 29.214. The interface between the PCRF and the PDN gateway (and so the SAE-GW) is called S7-interface and is based on the Gx-interface which is specified for 3GPP, e.g. Release-7 in 3GPP TS 29.212.

SUMMARY

The anticipated security architecture would mean that all communication between eNodeBs and SEGWs would need to use IPsec and be encrypted. This will put a heavy processing burden on eNodeBs and the SEGWs even though this strong security might not be needed for all the different types of bearers, e.g. bearer for web browsing or video streaming might not need security etc. In addition, some applications provide security on the application layers and it seems like waste of resources to also have transport level security for the bearers used in these cases.

This invention allows dynamic selection of security settings on a bearer level.

These and other advantages are achieved by means of method used in a mobile telecommunications network including at least one access point, at least one gateway device. The method comprises the steps of: deciding a security setting needed for a dedicated bearer signal by a network component, communicating the decision to a node needed for establishing communication, configuring or selecting by the access point a secure protocol as needed between the access point and the gateway devices, and the decision being based on one or several of the network deployments being used and/or network operator policies. According to one embodiment, the network component is an application level component being one or several of Proxy Call Session Control Function, P-CSCF, Interrogating Call Session Control Function, I-CSCF, or Serving Call Session Control Function, S-CSCF, or an IMS Application Server, AS. The network component transmits the security need to PCRF. Preferably, a session that needs security employs the secure protocol with encryption between the access point and the gateway device. In one embodiment, a session with less need for security uses a security protocol with message authentication and null encryption.

Generally, depending on which node that determines need of security, various protocols and nodes are modified. When the network components decide if a session needs to be secured following information is used: encryption activated or not, level of encryption, message authentication activated or not, level of message authentication. The network components may decide security based on information included in the Session Description Protocol, SDP part of the signalling related to establishment of a session. It is possible that other network components decide security based on Application Server (AS) including additional indication about security need. The S-CSCF uses the indication when forwarding an indication to the P-CSCF which maps security information to a new parameter in an AA-Request (AAR) message.

According to a second aspect of the invention the network component is PCRF (Policy Control and Charging Rules Function). The PCRF transmits the security information in a Re-Auth-Request (RAR) message to the SAE-GW which forwards the information to Mobility Management Entity, MME, and finally MME informs the access point about security setting requested together with additional information for the bearer to be established between the access point and gateway devices. The access points comprise information about the requested security setting and needed transport address information for the bearer signal to be established and the address information of the gateway devices IP-address and optionally a User Datagram Protocol, UDP, port for the bearer and based on this information the access point checks if a new IPsec relationship description, i.e. an IPSec Security Association (SA) needs to be established or if an existing IPsec SA can be used unmodified or needs to be updated. The method may further comprise using different transport address information for different bearer signals. The gateway device selects a local IP network address and signals this to the access point as part of the bearer establishment signalling. The gateway device may have separate logical IP-addresses locally based on multi-homing and comprises logical unit to select different local IP-addresses depending on the requested security setting. Preferably, GPRS Tunneling (GTP) protocol may be used. The method may further comprise changing GPRS Tunneling (GTP) protocol and selecting dynamically UDP port to be used for the different bearers and signalled between end nodes. The access point is configured to create a binding between a created radio bearer and the GTP tunnel to be used.

The traffic may be mapped in downlink to different IPsec SAs by the gateway by using a traffic selector to map the traffic to different IPsec SAs. The PCRF may contain needed policies to decide what level of security is needed for different bearers.

The decision on security settings may be updated based on a user equipment, UE, moving between different types of access points. The access point receives new parameter as part of handover and relocation signalling. When the access point receives an indication of the incoming handover request, it also receives information about the needed Serving GW addresses and security settings for all the active bearers that are to be handed over to the access point.

In one embodiment, the application level component selects a security level including an indication about the level in Session Description Protocol, SDP, and transmitting to P-CSCF. The information or parts of thereof are transmitted in one or several of: over Rx+/Rx-interface of P-CSCF in SDP to the PCRF, a Diameter protocol on Rx+/Rx-interface, S7/Gx interface between the PCRF and the SAE-GW or PDN gateway part of SAE-GW, S11 interface between SAE-GW and MME, S1-MME interface between MME and eNodeB.

The invention also relates to an infrastructure device adapted to receive and transmit signals to mobile stations and communication network, the device comprising memory, processing arrangement and receiver/transmitter arrangement for receiving/transmitting dedicated bearer signals. The receiver is further configured to receive a decided security setting, the decision being based on one or several of network deployments being used and/or network operator policies needed for a dedicated bearer signal by a network component in the network, and means to configure a secure protocol (IPsec) as needed between the device and a gateway device.

The invention also relates to a functional element (PCRF) in a communications network comprising means to receive a signal for indication of security need requests depending on operator policies for different applications and current network deployments used. The functional element comprises: means for including this indication in a bearer establishment signalling to network nodes, whereby a security level is selected depending on application needs and/or the current network being used, and a logic part comprising means to decide whether security is needed and a level of security to apply based on. The application level components, which may be one or several of P-CSCF, IMS AS, are configured to indicate that security needs are to be applied on the bearer. The network nodes comprise one or several of MME, eNodeB or SAE-GW.

The invention also relates to a data structure for use in a mobile telecommunications network, the network including at least one access point, at least one gateway device and at least one network component, the network component being configured to decide a security setting needed for a dedicated bearer signal, wherein the data structure comprises information on: encryption activation status, level of encryption, message authentication activation and/or level of message authentication.

It should be understood by a skilled person that the access point mentioned does not limit the invention to a WLAN or similar access points but merely concerns a network accessing arrangement.

BRIEF DESCRIPTION OF THE DRAWINGS

The present invention will be described in more details with reference to a number of drawings, in which.

DETAILED DESCRIPTION

In the following, the invention is described with reference to a general solution exemplified by reference to a LTE and SAE. However, it should be appreciated that the teachings of the invention can be applied to any network having nodes and infrastructure entities with ability to perform the teachings of the present invention.

Generally, the needed additions are made to the protocols and architecture to allow dynamic control of encryption and other security settings in the S1-interface.

Figure 1A:
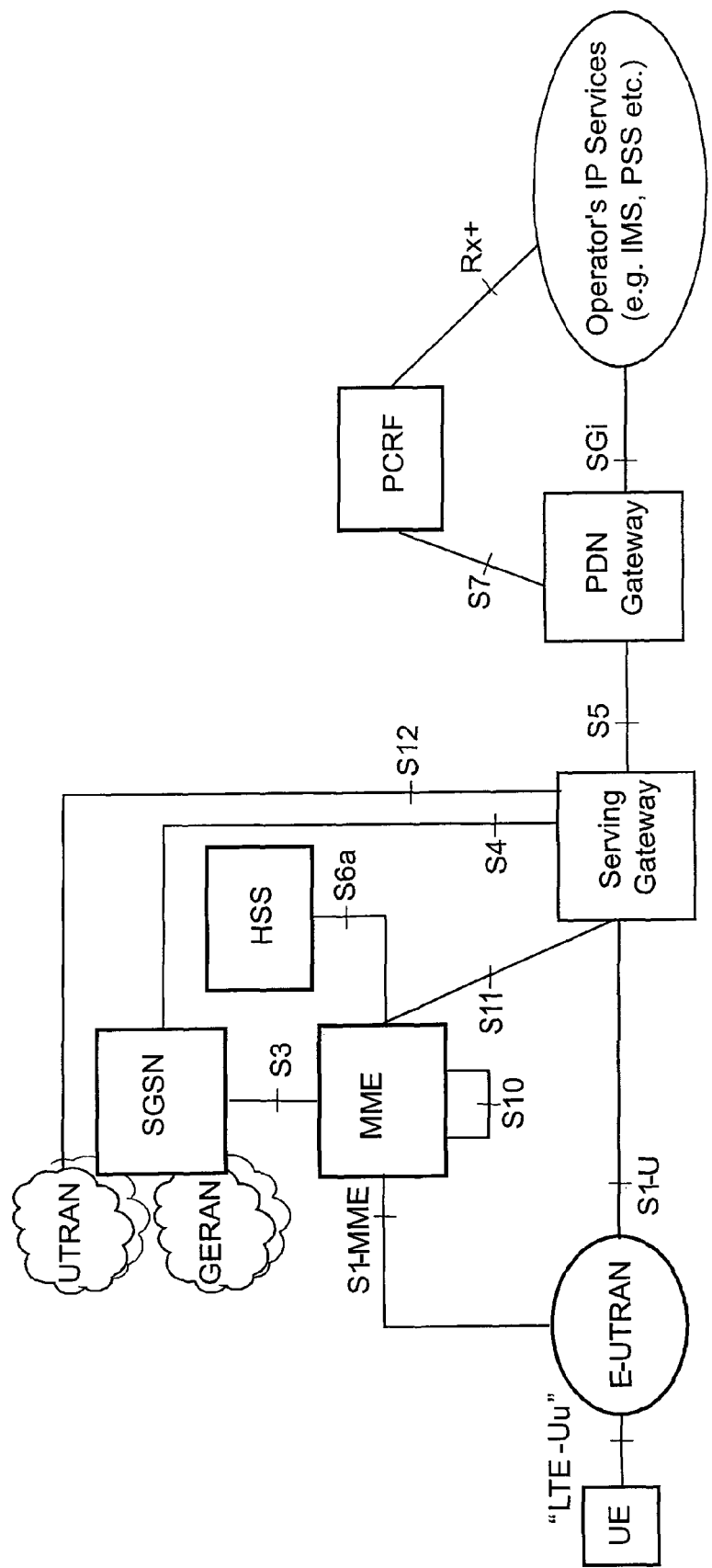
FIGS. 1a and 1b show conventional architectures so far agreed as part of the SAE/LTE standardization work in 3GPP.
Figure 1B:
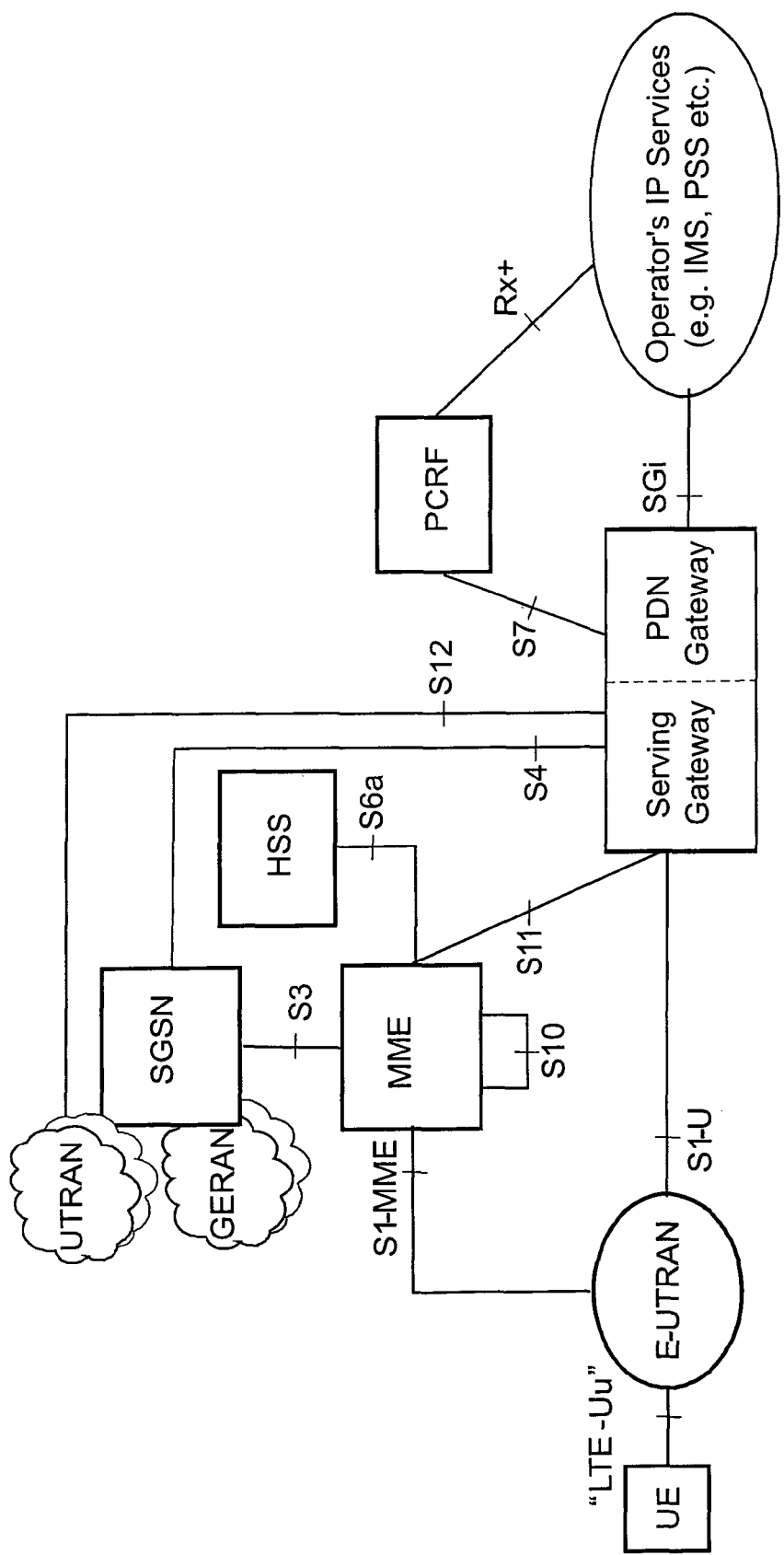
Figure 2:
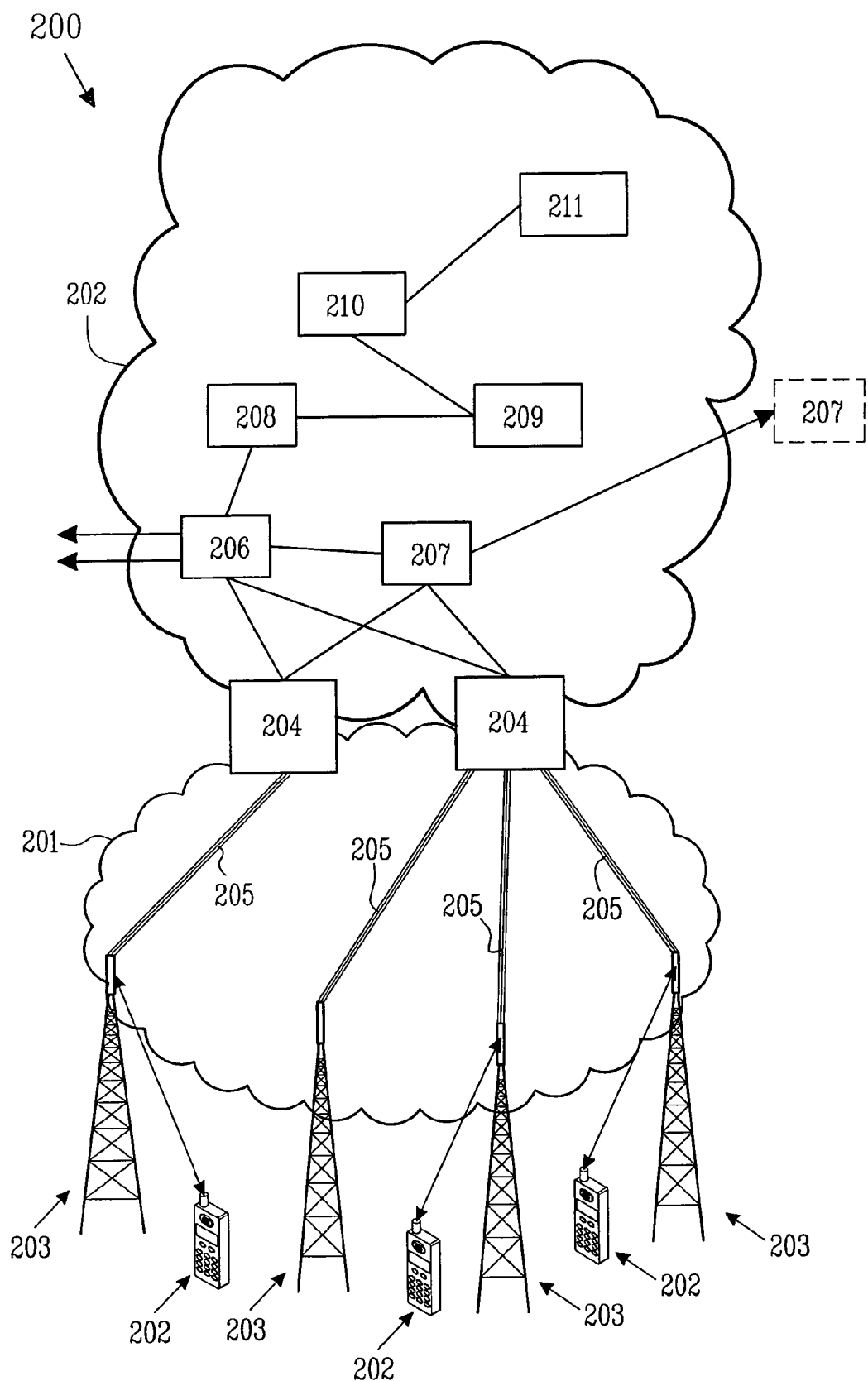
FIG. 2 is a network according to the present invention.
Figure 3:
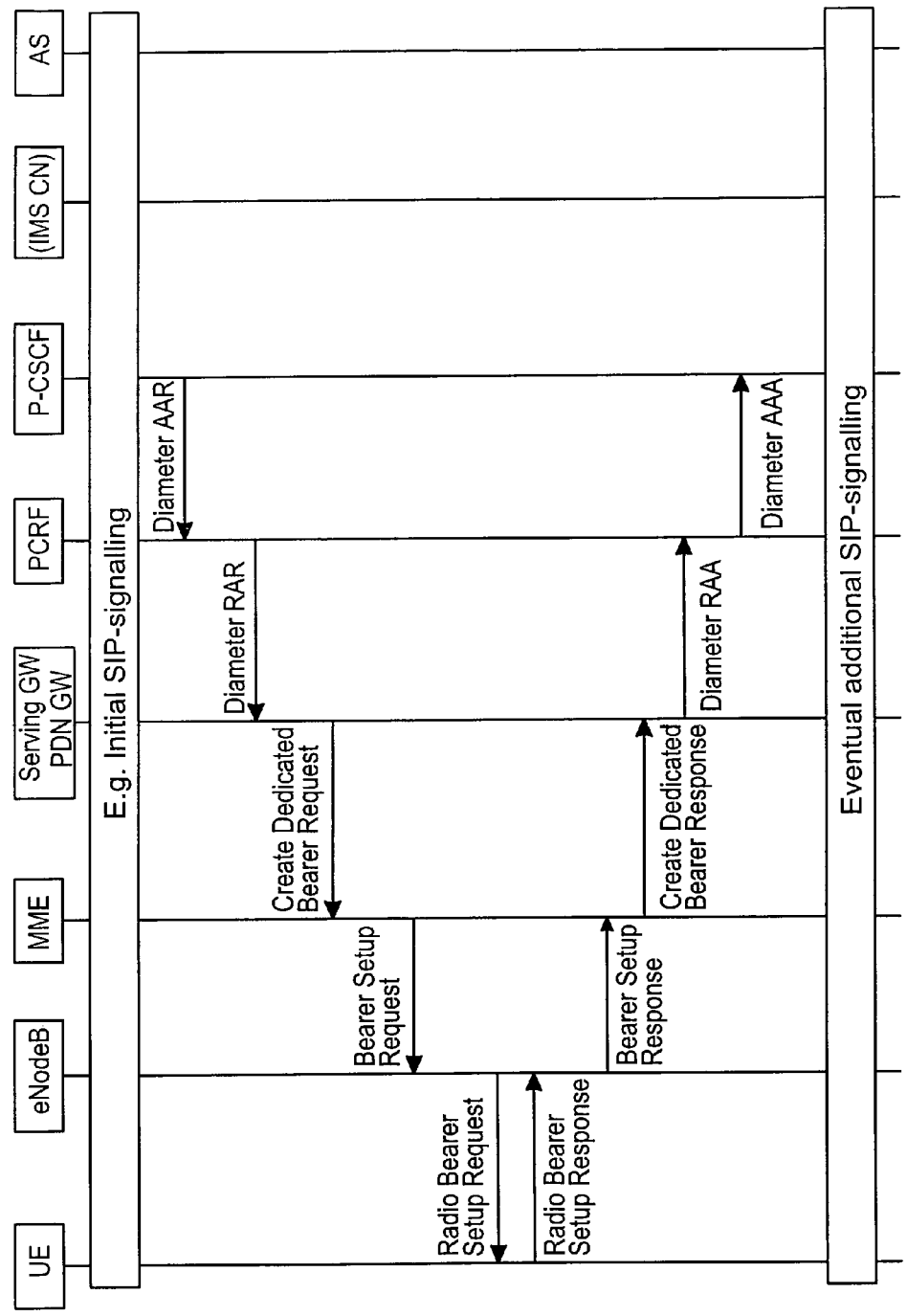
FIG. 3 is a signal flow diagram according to the prior art.

FIG. 2 illustrates the invention in a network. The network 200 consists of Internet 201 and Intranet 202 parts. The Internet 201 (or some other public and unsafe networks) can be used to provide parts of the connectivity between the eNodeB 203 and the SAE Core Network elements (i.e. MME and Serving Gateway) in the safe Intranet 202. In this case the eNodeBs 203 (eNB) are connected to the Intranet 202 through Security Gateways (SEGW) 204. Communication is enabled and secured using IPsec tunnels 205. SEGWs 204 enable communication for the eNodeBs 203 towards the SAE-GW 206 and MME 207, which are also interconnected. SAE-GW 206 communicates with PCRF 208, communicating with P-CSCF 209 communicating with IP Multimedia Subsystem (IMS) CN 210, which communicates with one or more IMS Application Servers (AS) 211.

Depending on, e.g. operator policies for the different applications and(/or) the current network deployment being used, such as for a voice call, the application level components (e.g. P-CSCF or IMS AS in the case for IMS VoIP call) can indicate that security needs to be applied on the bearer. This is signaled to the PCRF 208, which includes this indication in the bearer establishment signaling to the MME 207, eNodeB 203 and SAE-GW 206. This means that the security level is selected depending on application needs and the current network being used. In this way, a web browsing session, for example, can be done, using for example null encryption between eNodeB and SAE-GW and thus saving processing resources. Another possibility is that the PCRF contains the operator policies and the needed logic to decide whether security is needed for a specific application. The logic part is substantially the same as described earlier, i.e. the PCRF comprises means to decide whether security is needed and the level of security to apply based on, e.g. the requested bearer, the bearer properties, and the application requesting the bearer.

Additionally, the P-CSCF may include in an AA-Request message an order to indicate the particular service that an Application Function (AF) session belongs to. This information can then also be used by the PCRF to decide the security level to be selected and communicated to the other nodes. In addition, the PCRF may receive the entire Session Description Protocol (SDP) describing the session to be established and any part of the SDP can be used in the selection of the security level.

The Policy and Charging Control (PCC) Rule Function (PCRF) decisions may be based on one or more of the following:

- the session and media related information obtained from the AF via the Rx+/Rx reference point;
- the bearer and subscriber related information obtained from the Policy and Charging Enforcement Function (PCEF) over the S7/Gx reference point. The SAE-GW is functioning as the PCEF in the exemplary network scenario described;
- subscriber and service related data the PCRF may be aware of by configuration or through the Sp reference point (from the SPR);
- pre-configured information in the PCRF.

These rules (or subset) may also be used when selecting the security level.

Figure 5:
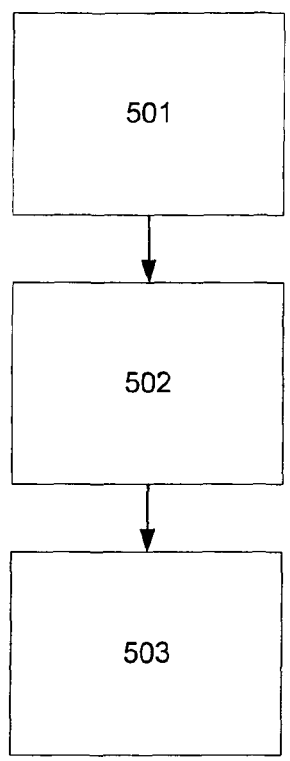
FIG. 5 is a flow diagram illustrating the steps according to the present invention.

In more detail, substantially the main steps of the invention, illustrated in FIG. 5, are the following:

501: Either one or more of the application level nodes or the PCRF node identify the security settings needed for a dedicated bearer. This decision is based on current network being used and the network operator policies for the different applications, 502: The above decision is communicated to all the needed nodes and 503: Finally the eNodeB receiving the information and configuring the IPsec Security Associations (SA) as needed between the eNodeB and the SEGW.

The sessions that need security use IPsec with encryption between the eNodeB and the SEGW. Sessions with less need for security could for example use IPsec with message authentication and 'null encryption'. This would lower the processing requirements substantially in both the eNodeBs and the SEGWs.

Another alternative would be to send data that do not require security outside the IPsec tunnel, but the most likely case would probably be to use 'null encryption' with message authentication.

This would mean that (at least) two different IPsec tunnels (or two different IPsec SAs for one IKE SA) need to be established between eNodeB and SEGW, one with encryption and one without. The number of IPsec SAs could be higher than two if there is for example need to have different levels of encryption or different levels of message authentication. The main point is that the number of needed IPsec SAs between the eNodeB and the SEGW is based on the number of different security settings needed for the different bearers transported between the eNodeB and the SEGW.

An automatic way to handle the establishment of the IPsec SA's is outlined below.

The invention provides methods, procedures, protocols and node modifications in order to control the selection of the IPsec SAs to use between the eNodeB and the SEGW for both uplink and downlink traffic for the different bearers that are transported between the eNodeB and the SEGW.

Depending on which node that determines if security is or is not needed, various protocols and nodes need to be modified. For example, once application level components have selected the security level then the indication about this is included in the SDP and passed to the P-CSCF which then passes the information in e.g. SDP over the Rx+/Rx-interface to the PCRF. Other possibility is to include some information in the Diameter protocol itself on the Rx+/Rx-interface. Another example is similar approach for the S7/Gx-interface and protocols used in this interface.

Figure 4:
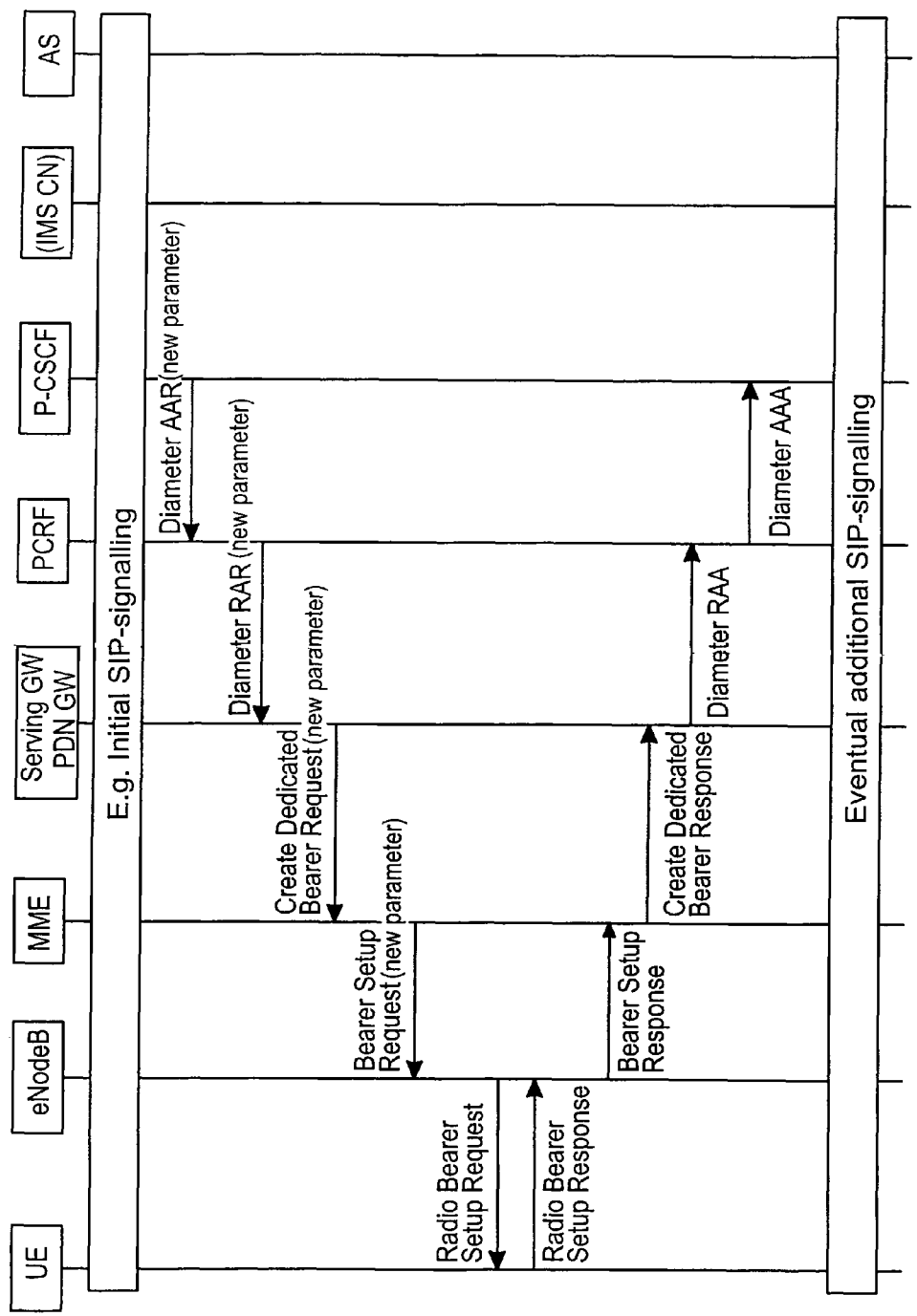
FIG. 4 is a signal flow diagram according to the present invention.

Referring now to FIG. 4, assuming that it's the application level components (e.g. S-CSCF in the IMS CN or IMS AS) that decide if session needs to be secured and indicate that for example in the SDP sent to the P-CSCF (the latter shown in FIG. 4), the following messages and corresponding node logic needs to be enhanced, highlighted in the sequence. The "new parameter" shown in the figure is the needed addition in the shown messages and protocols. It may contain different levels of configuration related to the security used between the eNodeB and the SEGW and it may contain e.g. the following information:

a encryption activated or not,
b level of encryption,
c message authentication activated or not,
d level of message authentication.

The application level components (e.g. S-CSCF or AS) could decide based on information included in the Session Description Protocol (SDP) for the session to be established (or modified) that security is needed for this session and one or more of the associated bearers. This could also be based on AS including on additional indication about that security is needed in for example the SDP and then the S-CSCF using that indication when forwarding the indication to the P-CSCF which maps the security information to a new parameter in the AA-Request (AAR) message sent to the PCRF over the Rx+/Rx interface. The PCRF sends on the security information in the Re-Auth-Request (RAR) message to the SAE-GW over the S7/Gx interface, the SAE-GW then forwards the information to MME over the S11 interface and finally MME informs the eNodeB (over the S1-MME interface) about the security setting requested together with all other information for the bearer to be established between the eNodeB and the Serving GW (i.e. the part of SAE-GW that is visible towards the eNodeB).

At this stage the eNodeB knows the requested security setting and also the needed transport address information for the bearer to be established. The transport address information consists of the Serving GW IP-address and optionally a Serving GW UDP port for the bearer. Based on this information the eNodeB can check if a new IPsec SA needs to be established or if an existing IPsec SA can be used unmodified or if an existing IPsec SA needs to be updated. The main problem here is to ensure that the established bearers are mapped to the correct IPsec SAs in both directions, i.e. in the uplink by the eNodeB and in the downlink by the SEGW. The uplink direction means here the direction from the UE towards the network i.e. from the eNodeB towards the SEGW in this context and the downlink direction means the opposite direction. The SEGW is not part of the bearer establishment even though the associated signaling is sent transparently through the SEGW. The eNodeB needs to ensure that the Traffic Selectors (TS) for the IPsec SAs in both the eNodeB and in the SEGW match the Serving GW transport address information for the established bearers.

The TSes are defined separately in uplink (called TSi as Traffic Selector initiator) and downlink (called TSr as Traffic Selector responder). The TSes are defined for each IPsec SA and are effectively used to decide how the IP traffic and IP protocol messages are mapped to the different IPsec SAs. The information included in the TSes is IP-address (range), TCP/UDP port (range) and protocol information. This means that the different bearers that need different security settings must use different transport address information. This is needed so that the SEGW can map the traffic in the downlink to the correct IPsec SAs with correct security settings.

The above need to use different transport address information for the different bearers means that either the IP-address or the UDP-port needs to be different for the different bearers. In the SAE case it is very likely that the Network initiated bearer activation procedure is used, and it is the Serving GW that selects the local IP network address and signals this to the eNodeB as part of the bearer establishment signaling. This means that the Serving GW would need to have separate logical IP-addresses locally based on e.g. multi-homing and have the logic to select different local IP-addresses depending on the requested security setting. This alternative should be possible with the existing GPRS Tunneling Protocol (GTP) which will to a certain extent be reused in the LTE/SAE architecture.

Another option that would mean changes to the GTP protocol is that also the UDP port to be used for the different bearers is dynamically selected and signaled between the end points (i.e. Serving GW and eNodeB). Presently, the GTP protocol is specified to use one fixed UDP port. In this case the Serving GW would have the logic to select different local UDP ports depending on the requested security setting.

Thus, using the above mechanisms, the eNodeB has ensured that the TSes for the IPsec SAs are correctly updated in both the eNodeB and the SEGW. The next step is to ensure that the traffic is also correctly mapped to these IPsec SAs. The eNodeB also creates a binding between the created radio bearer and the GTP tunnel to be used. The GTP-tunnel information contains the IP-address (and UDP port) to be used so when the eNodeB receives traffic from an UE using a specific radio bearer, it is capable of mapping this to a GTP tunnel. When the traffic is encapsulated with the IP address and UDP port information, the IPsec implementation in the eNodeB uses the traffic selectors to find the correct IPsec SA to send the traffic on towards the SEGW.

The mapping of traffic in the downlink to different IPsec SAs is done by the SEGW. In this case, the SEGW doesn't have any information about the established GTP tunnels and uses the traffic selectors (as updated by the eNodeB) to map the downlink traffic to the different IPsec SAs towards the eNodeB. This would be standard functionality but is easily applied only in the case that different UDP-ports are used for different bearers. Otherwise the eNodeB would need to also have (at least) two different IP addresses.

If it is decided that for example the IMS CN (e.g. I-CSCF or S-CSCF) is the decision point, logic needs to be added in these nodes and the SDP sent would need to be modified by a node in IMS CN, i.e. depending on decision point different protocols and node logic needs to be updated.

As mentioned before, still an additional approach would be to keep the Rx+/Rx-interface unmodified and let the PCRF contain the needed policies to decide what level of security is needed for the different bearers as described earlier As the decision on the security settings may be based on the current network deployment and(/or) the type of the eNodeB being used, the security settings might also be updated because of the UE 220 moving between different types of eNodeBs (i.e. from the source eNodeB to the target eNodeB). This means that the target eNodeB needs to receive the described new parameter also as part of handover and relocation signaling so that the same logic can also be applied in these cases. By doing this, the invention may cover more cases than described, i.e. initial bearer establishment case. When the target eNodeB receives the indication of the incoming handover request, it also receives information about the needed Serving GW addresses and security settings for all the active bearers that are to be handed over to this eNodeB. The target eNodeB can then perform the same steps as described earlier i.e. if a new IPsec SA needs to be established or if an existing IP sec SA can be used unmodified or if an existing IPsec SA needs to be updated.

Figure 6:
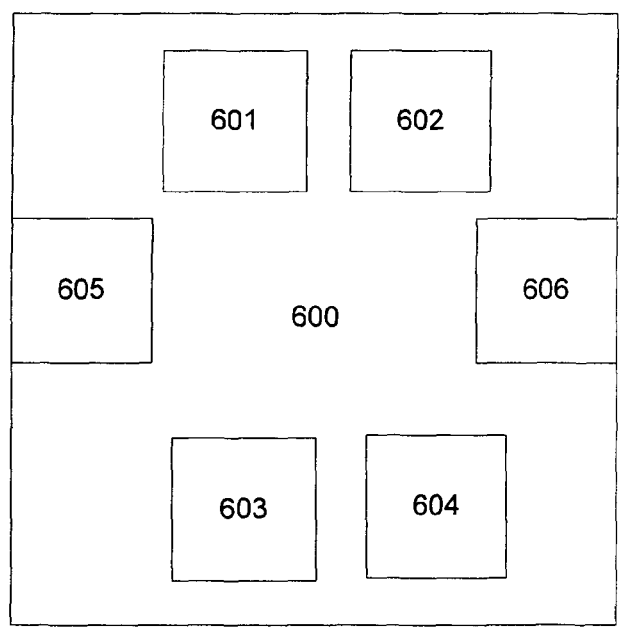
FIG. 6 is a block diagram schematically illustrating an infrastructure node device according to the present invention.

FIG. 6 illustrates in a schematic block diagram an infrastructure node according to the present invention, wherein a processing unit 601 handles communication data and communication control information. The infrastructure node 600 further comprises a volatile (e.g. RAM) 602 and/or non volatile memory (e.g. a hard disk or flash memory) 603, and an interface unit 604. The infrastructure node 600 may further comprise a downstream communication unit 605 and an upstream communication unit 606, each with a respective connecting interface (not shown). All units in the infrastructure node can communicate with each other directly or indirectly through the processing unit 601. Software for handling communication to and from the mobile units and other network elements attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Figure 7:
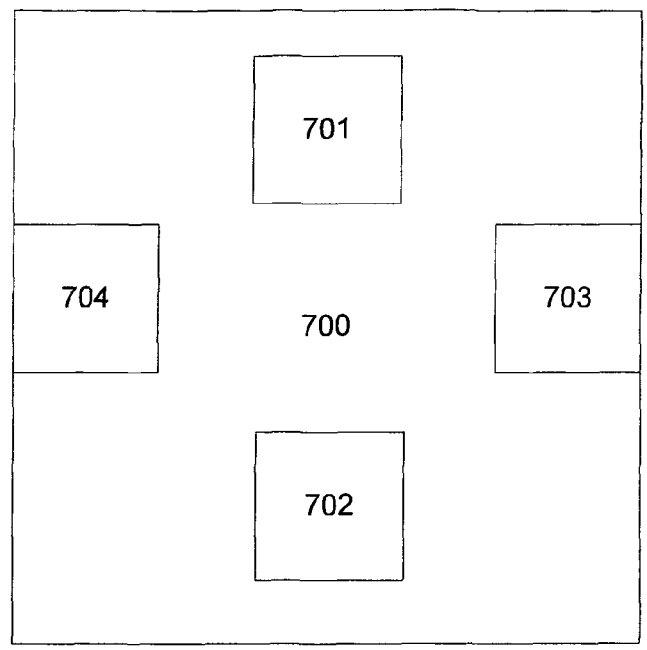
FIG. 7 is a block diagram schematically illustrating an access point device according to the present invention.

An infrastructure device 700, e.g. eNodeB, illustrated very schematically in FIG. 7, adapted to receive and transmit signals to mobile stations and a communication network. The device comprises processor 701, memory unit 702 and receiver and transmitter arrangements or interfaces 703 and 704, respectively, for receiving transmitting dedicated bearer signals. The memory comprises instruction-set to configure the device to receive a decided security setting. The decision as mentioned earlier is based on one or several of network deployments being used and network operator policies needed for a dedicated bearer signal by a network component in the network. The processor further is arranged to instruct to configure a secure protocol (IPsec) as needed between the device and a gateway device.

Figure 8:
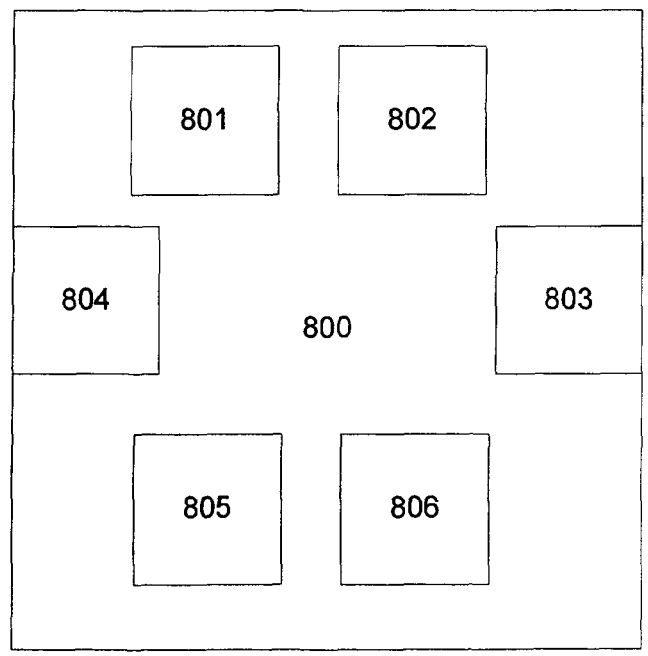
FIG. 8 is a block diagram schematically illustrating a functional element according to the present invention.

A functional element 800, e.g. PCRF, is illustrated very schematically in FIG. 8, may comprise:
processing arrangement 801,
memory unit 802,
a receiver 803, which also receives a signal for indication security settings depending on operator policies for different applications and current network deployments used
logical unit 804 for including the indication in a bearer establishment signalling to network nodes, whereby a security level is selected depending on application needs and the current network being used,
transmitter part 805, and
a logic part 806 comprising means to decide whether security is needed and a level of security to apply based on security need requests.

The logical part and unit may of course comprise of the processing arrangement.

It should be noted that those terms specific for special network standards are given as examples in the embodiments and similar wordings for entities and items having same functionality are not excluded from the invention.

ABBREVIATIONS

AF Application Function
AVP Attribute Value Pair
CRF Charging Rules Function
IP-CAN IP Connectivity Access Network
PCC Policy and Charging Control
PCEF Policy and Charging Enforcement Function
PCRF Policy and Charging Rule Function
PDF Policy Decision Function
P-CSCF Proxy-Call Session Control Function
QoS Quality of Service
SDF Service Data Flow
SPR Subscriber Profile Repository
UE User Equipment

The invention claimed is:

1. A method in a mobile telecommunications network including a plurality of access points and at least one gateway device, the method comprising:
    deciding, by a network component, whether a session needs to be secured based on:
        whether encryption is activated;
        a level of encryption;
        whether message authentication is activated; and
        a level of message authentication;
    if the session needs to be secured:
        deciding, by the network component, a security setting needed for a dedicated bearer signal based on at least one of:
            at least one of the network deployments being used; and
            network operator policies;
        communicating said security setting decision to a node arranged for establishing communication; and
        configuring or selecting, by one of said plurality of access points, a secure protocol as needed between one of said plurality of access points and said gateway device based on receiving the security setting decision.

2. The method of claim 1, wherein said network component is an application level component being one or several of Proxy Call Session Control Function (P-CSCF), Interrogating Call Session Control Function (I-CSCF), Serving Call Session Control Function (S-CSCF), or Application Server (AS).

3. The method of claim 1, wherein said network component transmits said security setting to a Policy and Charging Rules Function (PCRF).

4. The method of claim 1, further comprising employing said secure protocol with encryption between said access point and said gateway device.

5. The method of claim 1, further comprising employing a security protocol with message authentication and null encryption.

6. The method of claim 1, wherein said network component is a PCRF (Policy and Charging Rules Function).

7. The method of claim 6, wherein the PCRF transmits said security information in a Re-Auth-Request (RAR) message to the SAE-GW, which forwards said security setting to a Mobility Management Entity (MME), and wherein the MME informs the access point about the security setting requested together with additional information for the bearer to be established between the access point and gateway devices.

8. The method of claim 1, wherein said access points have information about the requested security setting and needed transport address information for the bearer signal to be established and the address information of the gateway devices IP-address and a User Datagram Protocol (UDP) port for the bearer and, based on this information, the access point checks if a new IPSec Security Association (SA) needs to be established, or if an existing IPsec SA can be used unmodified or needs to be updated.

9. The method of claim 8, further comprising mapping traffic in the downlink to different IPsec SAs by said gateway, by using a traffic selector to map the traffic to different IPsec SAs.

10. The method of claim 1, wherein the decision on security settings is based on the current network deployment or type of access point being used and the security settings are updated based on a user equipment (UE) moving between different types of access points.

11. A Policy and Charging Rules Function (PCRF) element in a communications network, comprising processing logic configured to:
    decide whether a session needs to be secured based on:
        whether encryption is activated;
        a level of encryption;
        whether message authentication is activated; and
        a level of message authentication; and
    if the session needs to be secured:
        decide a security setting needed for a dedicated bearer signal based on at least one of:
            at least one of the network deployments being used; and
            network operator policies; and
        include said indication in a bearer establishment signaling to network nodes, whereby a security level is selected depending on application needs and the current network being used, and to decide whether security is needed and a level of security to apply based on security need requests.

* * * * *